US008503862B2

(12) United States Patent
Hsieh et al.

(10) Patent No.: US 8,503,862 B2
(45) Date of Patent: Aug. 6, 2013

(54) SYSTEMS AND METHODS FOR IDENTIFYING SCENES IN A VIDEO TO BE EDITED AND FOR PERFORMING PLAYBACK

(75) Inventors: Ming-Kai Hsieh, Taipei (TW); Huan-wen Hsiao, Chiayi (TW)

(73) Assignee: Cyberlink Corp., Taipei (TW)

( * ) Notice: Subject to any disclaimer, the term of this patent is extended or adjusted under 35 U.S.C. 154(b) by 1268 days.

(21) Appl. No.: 12/137,809

(22) Filed: Jun. 12, 2008

(65) Prior Publication Data

US 2009/0310932 A1 Dec. 17, 2009

(51) Int. Cl.
*G11B 27/00* (2006.01)
*H04N 5/93* (2006.01)

(52) U.S. Cl.
USPC ............ 386/278; 386/241; 386/280; 386/281

(58) Field of Classification Search
USPC .................................... 386/52, 241, 278–288
See application file for complete search history.

(56) References Cited

U.S. PATENT DOCUMENTS

| | | | |
|---|---|---|---|
| 5,703,655 A | 12/1997 | Corey et al. | |
| 6,430,357 B1 * | 8/2002 | Orr | 386/244 |
| 6,571,054 B1 | 5/2003 | Tonomura et al. | |
| 6,628,889 B2 * | 9/2003 | Inoue | 386/241 |
| 7,286,749 B2 | 10/2007 | Shiiyama | |
| 7,366,671 B2 * | 4/2008 | Xu et al. | 704/270 |
| 7,382,933 B2 * | 6/2008 | Dorai et al. | 382/276 |
| 7,624,136 B2 * | 11/2009 | Kawate et al. | 386/239 |
| 7,765,574 B1 * | 7/2010 | Maybury et al. | 725/105 |
| 7,984,089 B2 * | 7/2011 | Gates et al. | 707/830 |
| 2002/0106188 A1 * | 8/2002 | Crop et al. | 386/52 |
| 2004/0049780 A1 * | 3/2004 | Gee | 725/32 |
| 2005/0257242 A1 * | 11/2005 | Montgomery et al. | 725/116 |
| 2005/0268317 A1 * | 12/2005 | Cormack et al. | 725/25 |
| 2006/0078288 A1 * | 4/2006 | Huang et al. | 386/52 |
| 2007/0288978 A1 | 12/2007 | Pizzurro | |
| 2008/0066136 A1 | 3/2008 | Dorai et al. | |
| 2008/0089657 A1 * | 4/2008 | Shibata et al. | 386/38 |
| 2008/0092168 A1 * | 4/2008 | Logan et al. | 725/44 |
| 2008/0193100 A1 * | 8/2008 | Baum et al. | 386/52 |
| 2008/0263450 A1 * | 10/2008 | Hodges et al. | 715/723 |
| 2008/0285939 A1 * | 11/2008 | Baum et al. | 386/52 |
| 2009/0052860 A1 * | 2/2009 | Derrenberger et al. | 386/46 |

FOREIGN PATENT DOCUMENTS

| | | |
|---|---|---|
| EP | 1885127 A | 2/2008 |
| WO | 2007127695 A | 11/2007 |

* cited by examiner

*Primary Examiner* — Jeffrey Pwu
*Assistant Examiner* — Jayesh Jhaveri
(74) *Attorney, Agent, or Firm* — McClure, Qualey & Rodack, LLP

(57) ABSTRACT

Various embodiments described herein provide users with a fast and efficient way for identifying scenes for editing purposes. At least one embodiment is a method for editing video. The method comprises receiving a video with scenes to be edited, receiving a scene selection for editing, and partitioning the selected scene into subscenes based on the presence of subtitles, audio analysis, or a combination of both. The method further comprises identifying subscenes of interest, receiving editing commands for the subscenes of interest, and associating the editing commands with the video for future playback, wherein the video is left unmodified.

25 Claims, 8 Drawing Sheets

SYSTEMS AND METHODS FOR IDENTIFYING SCENES IN A VIDEO TO BE EDITED AND FOR PERFORMING PLAYBACK

TECHNICAL FIELD

The present disclosure generally relates to multimedia content and more particularly, relates to editing scenes in a video.

BACKGROUND

With the vast array of video editing tools available, many people can readily edit existing video and incorporate special effects to customize videos and to produce stylish graphics. These videos may later be published for others to view. In many cases, however, an individual may want a more professional look before sharing the video with friends and family. Use of professional video editing services may not be a feasible alternative in many instances due to cost. Furthermore, traditional off-the-shelf video editing solutions are proving to fall short in meeting the needs of consumers. One common problem with traditional video editing solutions is the amount of time and degree of complexity involved in the overall editing process. Another perceived problem associated with conventional methods is that the original video is typically modified during the editing process. This can present a problem if the video content is under copyright protection.

SUMMARY

Briefly described, one embodiment, among others, is an apparatus for identifying scenes in a video to be edited. The apparatus comprises a playback module for reading a video and a scene selection module for receiving a scene selection within the video. In accordance with some embodiments, the scene selection module is configured to receive a start time and an end time defining a scene. The apparatus further comprises a subscene module configured to partition the scene selection into subscenes, wherein the subscene module is configured to analyze subtitles and audio content within the video to determine subscenes of interest. The apparatus also includes an editing module configured to present scenes of interest, wherein the editing module is further configured to receive editing commands for the subscenes of interest. The editing module is also configured to associate the editing commands with the video for future playback wherein the video is left unmodified. The playback module is further configured to incorporate the editing commands during playback of the video.

Another embodiment is a method for identifying scenes to be edited. The method comprises receiving a video with scenes to be edited, receiving a scene selection for editing and partitioning the selected scene into subscenes based on at least one of: the presence of subtitles and audio analysis. The method further comprises identifying subscenes of interest and receiving editing commands for the subscenes of interest. The method further comprises associating the editing commands with the video for future playback, wherein the video is left unmodified.

Yet another embodiment is a method for editing video and performing playback of the video. In accordance with such embodiments, the method comprises receiving a scene selection for editing by receiving a start time and an end time with respect to the video, partitioning the scene into subscenes based on one of: the display of subtitles and audio analysis, and receiving editing commands for the subscenes. The method further comprises associating the editing commands with the video and generating a remix file to store the editing commands for future playback, and incorporating the editing commands during playback of the video, wherein the video is left unmodified.

Other systems, methods, features, and advantages of the present disclosure will be or become apparent to one with skill in the art upon examination of the following drawings and detailed description. It is intended that all such additional systems, methods, features, and advantages be included within this description, be within the scope of the present disclosure, and be protected by the accompanying claims.

BRIEF DESCRIPTION OF THE DRAWINGS

Many aspects of the disclosure can be better understood with reference to the following drawings. The components in the drawings are not necessarily to scale, emphasis instead being placed upon clearly illustrating the principles of the present disclosure. Moreover, in the drawings, like reference numerals designate corresponding parts throughout the several views.

DETAILED DESCRIPTION

Figure 1:
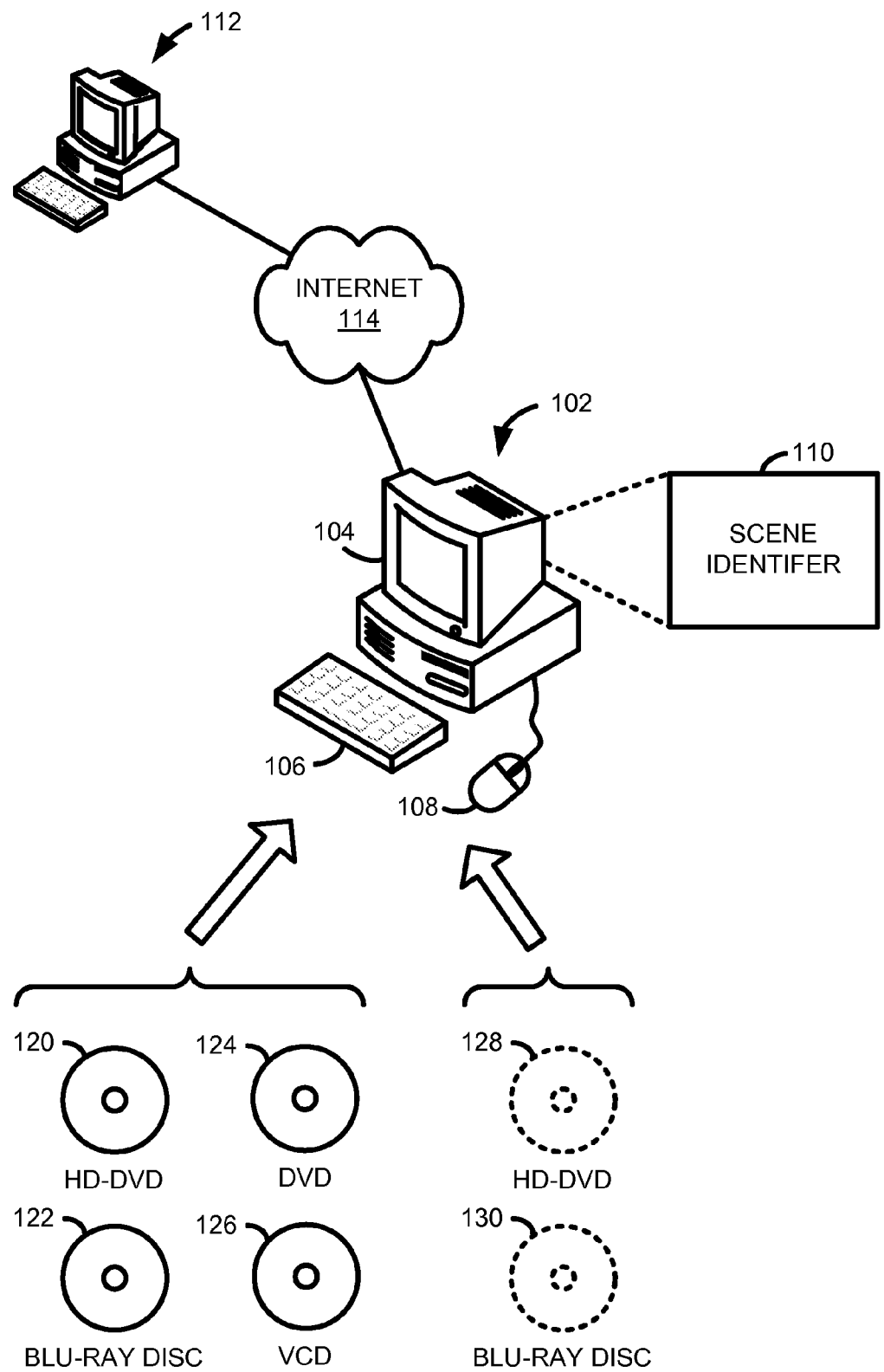
FIG. 1 depicts a top-level diagram of a system for identifying scenes within a video.

Having summarized various aspects of the present disclosure, reference will now be made in detail to the description of the disclosure as illustrated in the drawings. While the disclosure will be described in connection with these drawings, there is no intent to limit it to the embodiment or embodiments disclosed herein. On the contrary, the intent is to cover all alternatives, modifications and equivalents included within the spirit and scope of the disclosure as defined by the appended claims.

As generally known, subtitles refer to the text displayed on top of the video which convey the dialog taking place in the video. Subtitles may be a form of translation in a particular language or simply a textual rendering of the dialog in the same language in which the video/audio portions were recorded. Subtitles therefore offer viewers an alternative means to follow the dialog taking place within the video. For many viewers, subtitles or closed captioning plays an integral part in being able to fully experience a particular film or television program. For some viewers, closed captioning is an important means for allowing them to follow dialog that takes place during the course of a film. For others, subtitles allow viewers to follow dialog in another language. Moreover, subtitles allow viewers to view the lyrics of a particular song being played in a video (e.g., a music video).

Video content stored on such media as DVDs (Digital Video Disc), for example, typically offer consumers the option to view the video while listening to the audio portion in a language other than the language originally associated with the video. For example, consumers may elect to view a movie originally recorded in English while listening to the audio portion dubbed in Mandarin. Furthermore, consumers usually have the option of viewing the video content while viewing subtitles in a selected language. As an example, it's possible to view a video while listening to the audio portion dubbed in French and while displaying subtitles in Spanish.

In some cases, an individual may want to provide customized subtitles in place of original subtitles to provide humor, for instance. To accomplish this, an individual typically selects a scene to be edited. Identifying a scene for editing, however, can be a tedious and time consuming process as the individual must precisely mark a precise start time and an end time. This may involve, for example, playing the video at a reduced speed such that a precise start time and end time can be marked. The start and end times must be precisely marked so that the user can incorporate special effects, such as substitute subtitles, for example. In order to replace the original subtitles found in a video title, the precise "boundaries" of the subtitles must be determined in order to allow the user to incorporate customized subtitles.

Embodiments described herein automatically derive boundaries (e.g., start and end times) for scenes and subscenes. For purposes of this disclosure, a "subscene" refers to smaller, finer segments within a particular scene. As summarized above, various embodiments described herein provide users with a fast and efficient way for identifying scenes for editing purposes. While particular scenes or frames within a video may be referred to interchangeably herein as "scenes" or "segments," it should be noted that the term "scene" may refer to transition points within a video where a logical scene change occurs. The term, however, may also generally refer to any window of time within a particular video title. The time instants that define the window may be pre-determined or specified by a user. As a non-limiting example of a logical scene, a DVD might include a scene titled "Chapter 1—Car Chase." As another non-limiting example, a user might arbitrarily enter a start time and an end time surrounding an action sequence as a scene.

Reference is now made to FIG. 1, which depicts a top-level diagram of a system for identifying scenes within a video. For some embodiments, a system for identifying scenes within a video may be incorporated in a computing device 102 such as a computer workstation or a laptop, for example. The computing device 102 may include a display 104 and input devices such as a keyboard 106 and a mouse 108. Furthermore, the computing device 102 may execute a scene identifier 110, which a user might utilize to view a video title, input special effects, and select an insertion point within the video in which to incorporate the special effects, for example. For some embodiments, the scene identifier 110 may be integrated into a software DVD player and configured to provide a user interface. The user may specify a scene within the video title via an input device such as a mouse, for example.

As illustrated in FIG. 1, the computing device 102 may be further configured to read multimedia content in various formats or stored on various types of storage media. As non-limiting examples, the computing device 102 is capable of reading media content encoded in such formats as Digital Video Disc (DVD) 124, Video CD (VCD) 126, and newer formats such as High Definition DVD (HD-DVD) 120 and BLU-RAY Disc 122. In some embodiments, the computing device 102 may also be configured to read multimedia content from managed copies of an HD-DVD 128 or a BLU-RAY Disc 130. The phrase "managed copy" refers to authorized copies of multimedia content used as a reference video for editing purposes. The above exemplary formats are merely examples, and it is intended that the various embodiments described herein cover any type of multimedia content in its broadest sense.

The computing device 102 accepts the storage media 120, 122, 124, 126 or managed copies 128, 130 containing the video content and plays back the video for a user to view. In some embodiments, the computing device 102 may be further coupled to a network, such as the Internet 114. For such embodiments, video may be downloaded from another computing device 112 also coupled to the Internet 114. The user may then utilize the scene identifier 110 to select scenes for editing. Furthermore, special effects specified by the user may be uploaded to another computing device 112 for playback purposes. For example, a user may incorporate a series of customized subtitles and audio effects and upload these customized effects for another user to incorporate during playback of the same video (e.g., a copy of the video title).

Figure 2:
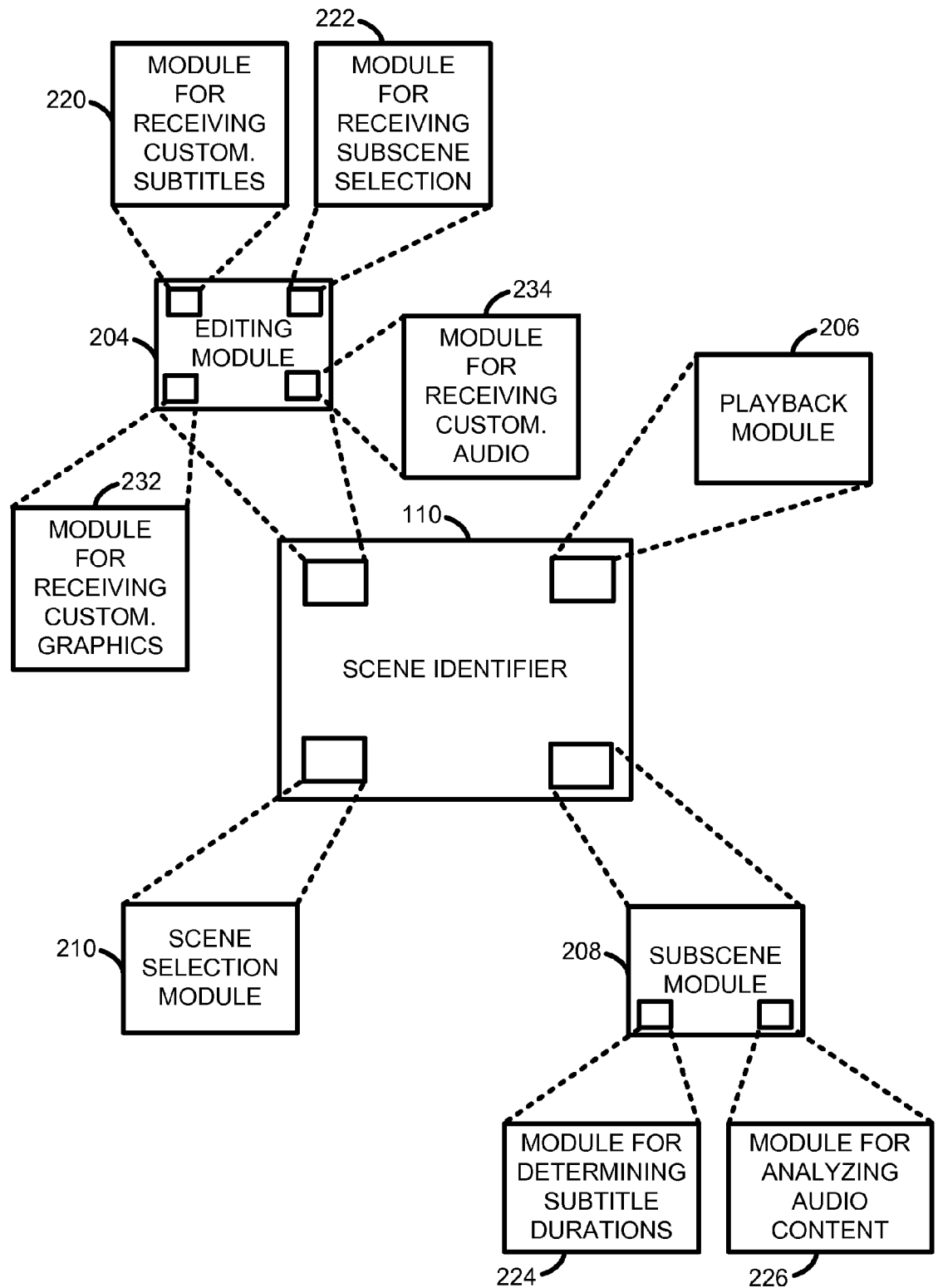
FIG. 2 is a block diagram illustrating various components of the system in FIG. 1.

Reference is now made to FIG. 2, which is a block diagram illustrating various components of the system in FIG. 1. For some embodiments, the computing device 102 in which the scene identifier 110 is incorporated may comprise a playback module 206, a scene selection module 210, a subscene module 208, and an editing module 204. The playback module 206 further comprises a module for both reading a video title (from a DVD or a BLU-RAY Disc, for example) and playing back the content for a user. The scene selection module 210 receives a scene selection from a user for editing purposes. The scene selection specified by the user may be an approximation of a scene within the video. In accordance with some embodiments, the scene selection process may comprise receiving a start time and an end time from the user.

The subscene module 208 further comprises a module for determining subtitle durations 224 and a module for analyzing audio content 226. The subscene module 208 divides the scene selection received by the scene selection module 210 into smaller segments for editing purposes. For some embodiments, the scene may be partitioned into segments based on the duration of subtitles displayed in the video using module 224. Alternatively, the scene may be partitioned based on the audio content within a particular scene. Module 226 may be configured to divide a scene up based on distinct voices detected within the selected scene, for example. The editing module 204 generally receives customized effects to be incorporated into particular subscenes. Accordingly, the editing module 204 may comprise a module for receiving customized subtitles 220, a module 222 for receiving selections of subscenes to be removed, and a module 232 for receiving customized graphics. The editing module 204 may further comprise a module for receiving customized audio 234.

Figure 3:
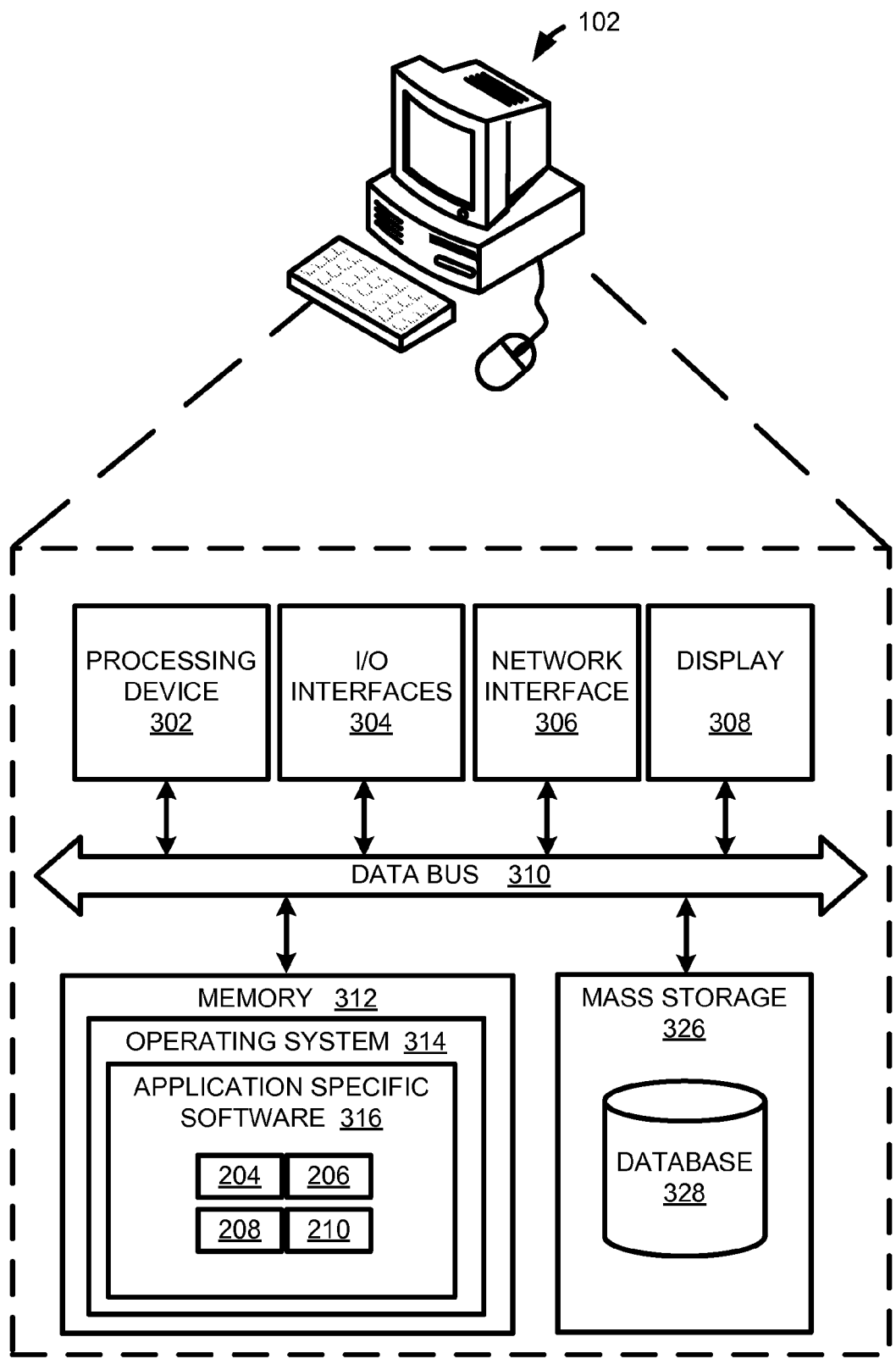
FIG. 3 illustrates an embodiment of the computing device shown in FIG. 1 for executing the various components shown in FIG. 2.

Reference is now made to FIG. 3, which illustrates an embodiment of the computing device shown in FIG. 1 for executing the various components shown in FIG. 2. Generally speaking, the computing device 102 may comprise any one of a wide variety of wired and/or wireless computing devices, such as a desktop computer, portable computer, dedicated server computer, multiprocessor computing device, cellular telephone, personal digital assistant (PDA), handheld or pen based computer, embedded appliance and so forth. Irrespective of its specific arrangement, computing device 102 can, for instance, comprise memory 312, a processing device 302, a number of input/output interfaces 304, a network interface 306, a display 308, and mass storage 326, wherein each of these devices are connected across a data bus 310.

Processing device 302 can include any custom made or commercially available processor, a central processing unit (CPU) or an auxiliary processor among several processors associated with the computing device 102, a semiconductor based microprocessor (in the form of a microchip), a macroprocessor, one or more application specific integrated circuits (ASICs), a plurality of suitably configured digital logic gates, and other well known electrical configurations comprising discrete elements both individually and in various combinations to coordinate the overall operation of the computing system.

The memory 312 can include any one of a combination of volatile memory elements (e.g., random-access memory (RAM, such as DRAM, and SRAM, etc.)) and nonvolatile memory elements (e.g., ROM, hard drive, tape, CDROM, etc.). The memory 312 typically comprises a native operating system 314, one or more native applications, emulation systems, or emulated applications for any of a variety of operating systems and/or emulated hardware platforms, emulated operating systems, etc. For example, the applications may include application specific software 316 such as the scene identifier 110, which may include any of the modules 204, 206, 208, 210 described with respect to FIG. 2. One of ordinary skill in the art will appreciate that the memory 312 can, and typically will, comprise other components which have been omitted for purposes of brevity.

Input/output interfaces 304 provide any number of interfaces for the input and output of data. For example, where the computing device 102 comprises a personal computer, these components may interface with user input device 304, which may be a keyboard or a mouse, as shown in FIG. 1. Where the computing device 102 comprises a handheld device (e.g., PDA, mobile telephone), these components may interface with function keys or buttons, a touch sensitive screen, a stylist, etc. Display 308 can comprise a computer monitor or a plasma screen for a PC or a liquid crystal display (LCD) on a hand held device, for example.

In the context of this disclosure, a "computer-readable medium" stores, communicates, propagates, or transports the program for use by or in connection with the instruction execution system, apparatus, or device. The computer readable medium can be, for example, but not limited to, an electronic, magnetic, optical, electromagnetic, infrared, or semiconductor system, apparatus, device, or propagation medium. More specific examples (a non-exhaustive list) of the computer-readable medium may include the following: an electrical connection (electronic) having one or more wires, a portable computer diskette (magnetic), a random access memory (RAM) (electronic), a read-only memory (ROM) (electronic), an erasable programmable read-only memory (EPROM, EEPROM, or Flash memory) (electronic), an optical fiber (optical), and a portable compact disc read-only memory (CDROM) (optical).

With further reference to FIG. 3, network interface device 306 comprises various components used to transmit and/or receive data over a network environment. By way of example, the network interface 306 may include a device that can communicate with both inputs and outputs, for instance, a modulator/demodulator (e.g., a modem), wireless (e.g., radio frequency (RF)) transceiver, a telephonic interface, a bridge, a router, network card, etc.). The computing device 102 may further comprise mass storage 326. For some embodiments, the mass storage 326 may include a database 328 to store and manage such data as metadata.

Figure 4A:
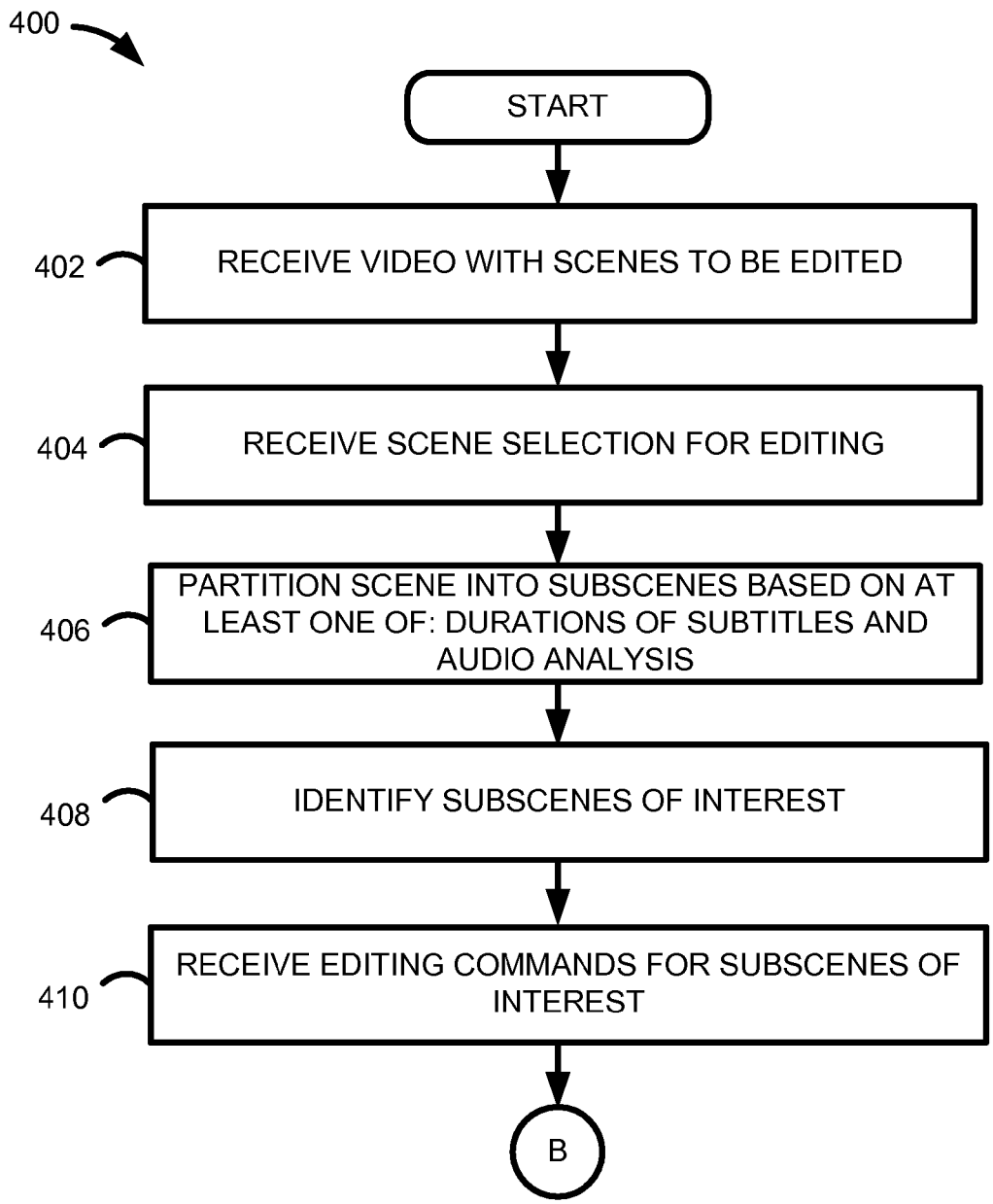
FIGS. 4A-4B depict an embodiment of a method for identifying scenes and receiving editing commands using the system depicted in FIGS. 1-3.
Figure 4B:
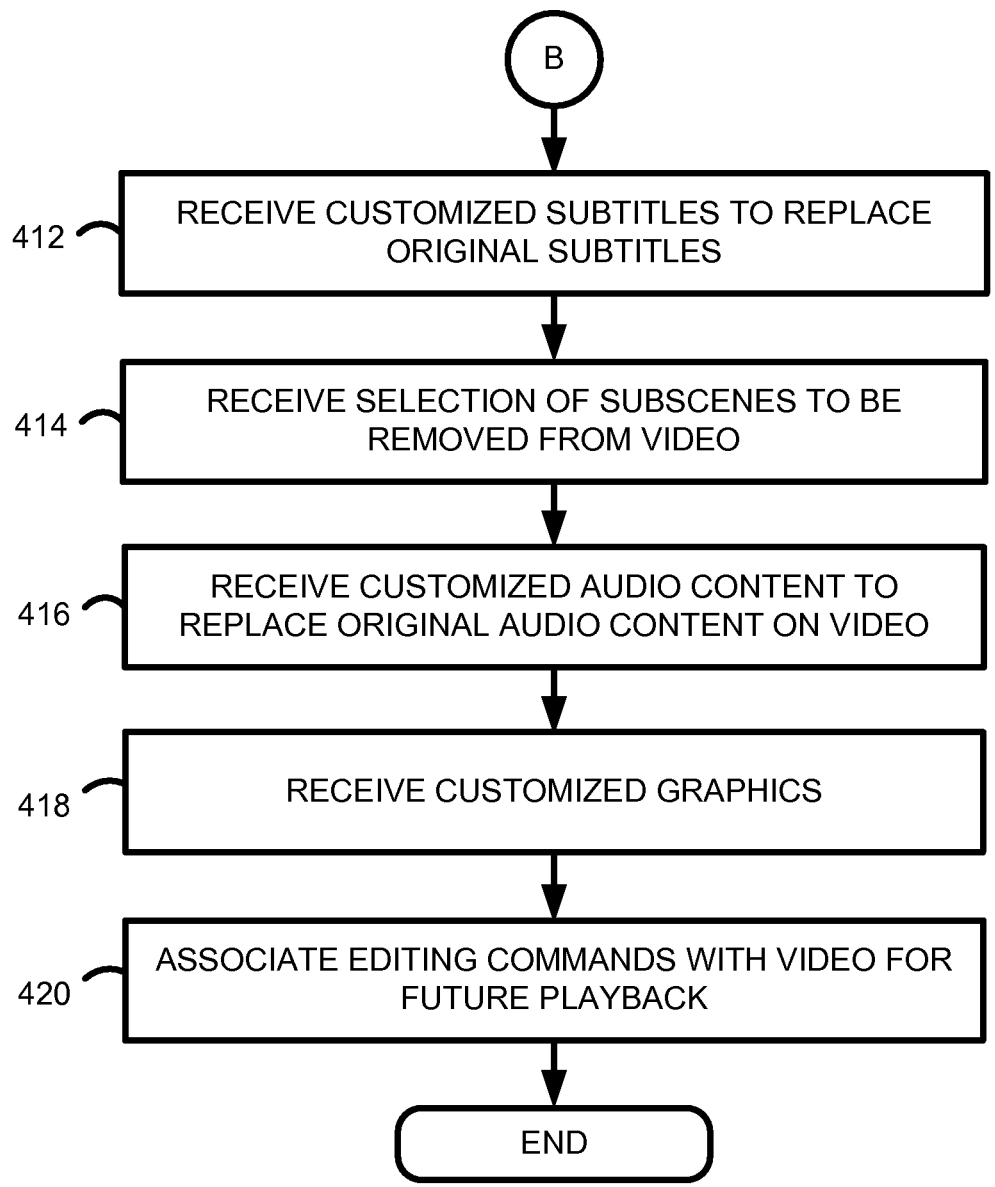

Reference is made to FIGS. 4A-B, which depict an embodiment of a method for identifying scenes and receiving editing commands. Beginning in step 402, a video title with scenes to be edited is received. As discussed earlier with respect to FIG. 1, the video title may be stored on an optical storage medium such as an HD-DVD or a BLU-RAY Disc. The video title may also be stored within a managed copy of a HD-DVD or BLU-RAY Disc. Upon playback of the video title, a user may specify a scene to be editing. In step 404, this scene selection is received, and in step 406, the scene is partitioned into smaller segments or subscenes based on at least one of the following: 1) the durations of subtitles within the video; and 2) analysis of audio content present within the selected scene.

In step 408, subscenes of interest are identified and presented to the user. Subscenes of interest refer to subscenes or segments within the selected scene in which a subtitle is being displayed or in which audio content (e.g., dialog) is present. These subscenes of interest may later be edited by the user. (Alternatively, the user may elect to remove those subscenes that do not contain any subtitles or audio content.) In step 410, special effects are received. As a non-limiting example, the user might elect to insert customized subtitles in place of the original subtitles originally embedded in the video. As another example, the user might elect to play a particular sound file in place of the original audio content. Alternatively, the customized audio can be mixed with the original soundtrack on the video to produce a combination of audio content. As yet another example, the user can superimpose customized graphics onto the video. This might entail, for example, using a drawing tool to place objects into the video.

With reference to FIG. 4B, customized subtitles are received (step 412). In accordance with some embodiments, the method may also include receiving a selection of subscenes to be removed (step 414) or receiving customized audio content to be inserted (step 416), as described above. In some embodiments, the method may further comprise receiving customized graphics (step 418), which may be overlaid on top of the original video content. The phrase "editing commands" within this disclosure broadly refers to any means for modifying media content. Editing commands may comprise data or instructions that trigger or initiate changes to a particular video. For example, with reference to steps 412-418 above, the customized subtitles, customized audio content, etc. may be generally characterized as editing commands. Editing commands may also take the form of executable code. One skilled in the art should recognize that editing commands can be implemented in other ways without altering the scope of the present invention. In step 420, the special effects received in step 410 may be stored and associated with that particular video for future playback. In accordance with preferred embodiments, the special effects may be stored in a remix file. The remix file specifies the special effects to be incorporated upon playback of the original video title and may be stored in any number of formats. It should be emphasized that by utilizing the remix file, the original video content stored on the storage medium (e.g., DVD, HD-DVD) or within a managed copy is left unmodified.

Figure 5:
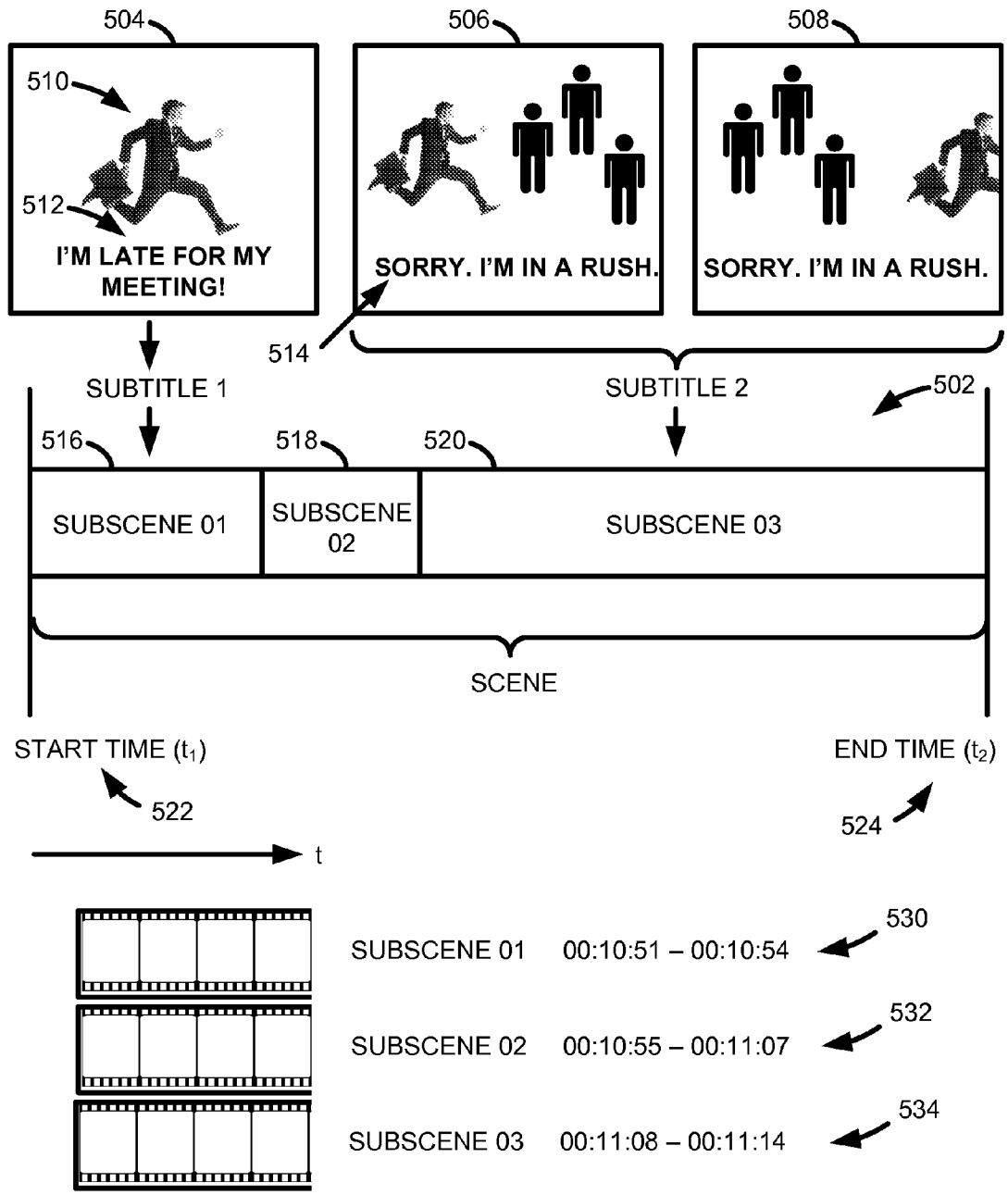
FIG. 5 illustrates the step shown in FIGS. 4A-4B for partitioning a scene into subscenes.

FIG. 5 illustrates the step shown in FIGS. 4A-4B for partitioning a scene into subscenes. FIG. 5 depicts a scene 502 specified by a user. The scene 502 may be selected based on approximate start 522 and end times 524, which are specified by the user. The selected scene 502 may then be automatically subdivided into smaller segments or subscenes for editing purposes. In the example shown in FIG. 5, the scene 502 is divided into three subscenes 516, 518, 520 based on the duration of subtitles contained within the selected scene 502. This may be performed using the module 224 depicted in FIG. 2.

The top of FIG. 5 shows a series of frames within the video, where multiple frames typically comprise a particular subscene. For purposes of illustration, only a few frames are shown in FIG. 5. In frame 504, an individual 510 is shown running. The subtitle "I'm late for my meeting!" is displayed while the individual 510 is running. The duration of this subtitle ("I'm late for my meeting!" 512) determines the length in time of the first subscene 516 (and the number of frames that comprise that subscene). The second subscene 518 may be comprised of a series of frames in which no subtitles are shown. In the next series of frames 506, 508, the individual 510 is shown running through a crowd. The subtitle "Sorry. I'm in a rush." 514 is displayed. Again, the duration of this subtitle determines the length in time of the subscene 520. In the illustration shown, the subtitle "Sorry. I'm in a rush." 514 spans frames 506 and 508, both of which are included within the third subscene 520.

The bottom of FIG. 5 shows the subscenes 516, 518, 520 and their corresponding durations 530, 532, 534. As will be described in more detail below, this information may be presented to the user for editing purposes. In the non-limiting shown, "Subscene 01" 516 spans 00:10:51 to 00:10:54. "Subscene 02" 518, which doesn't contain any dialog, spans 00:10:55 to 00:11:07. "Subscene 03" 520 spans 00:11:08 to 00:11:14. In accordance with exemplary embodiments described herein, the identification of subscenes and corresponding timing information are automatically derived so that the user does not have to manually specify each of the subscenes. The user simply identifies an approximate scene 502 within the video title. While the embodiments described above involve entering an approximate start and end time, the user may also visually mark the boundaries of a given scene during playback of the video title.

Figure 6:
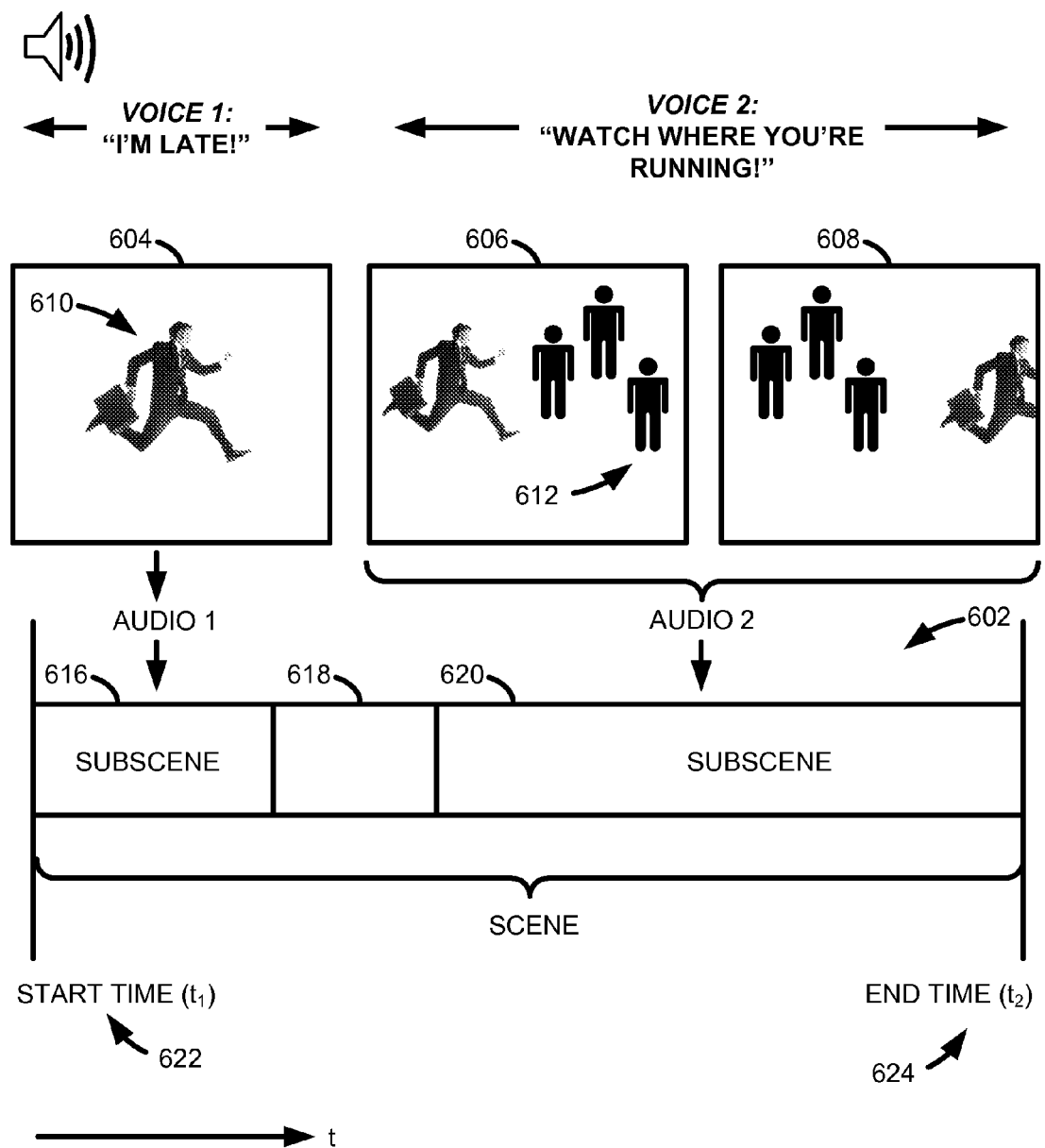
FIG. 6 illustrates an alternative embodiment for partitioning a scene into subscenes, as shown in FIGS. 4A-4B.

FIG. 6 illustrates an alternative embodiment for partitioning a scene into subscenes, as shown in FIGS. 4A-4B. In the illustration shown, the scene is partitioned based on audio content within the video title. FIG. 6 again shows a scene 602 specified by a user. Again, the scene 602 may be selected based on approximate start 622 and end times 624, which are specified by the user. The selected scene 602 may then be automatically subdivided into subscenes for editing purposes. In the example shown in FIG. 6, the scene 602 is divided into three subscenes 616, 618, 620 based on the audio content contained in the selected scene 602. This may be performed using the module 226 depicted in FIG. 2.

The top of FIG. 6 again shows a series of frames within the video, where multiple frames comprise a particular subscene. As with FIG. 5, only a few frames are shown for purposes of illustration. In frame 604, an individual 610 is shown running while shouting, "I'm late!" (denoted as "AUDIO 1"). The duration of AUDIO 1 determines the duration of the corresponding subscene 616 (and the number of frames that comprise that subscene). The second subscene 618 may be comprised of a series of frames in which there is no audio content. It should be noted, however, that the second subscene 618 may also be comprised of frames in which there is simply no dialog taking place. In particular, such frames may still include some audio content such as background music, for example. In the next series of frames 606, 608, the individual 610 is shown running through a crowd. In the illustration shown in FIG. 6, someone in the crowd 612 shouts, "Watch where you're running!" (denoted as "AUDIO 2"). Here, the duration of AUDIO 2 spans frames 606 and 608, both of which are included within the third subscene 620.

Figure 7:
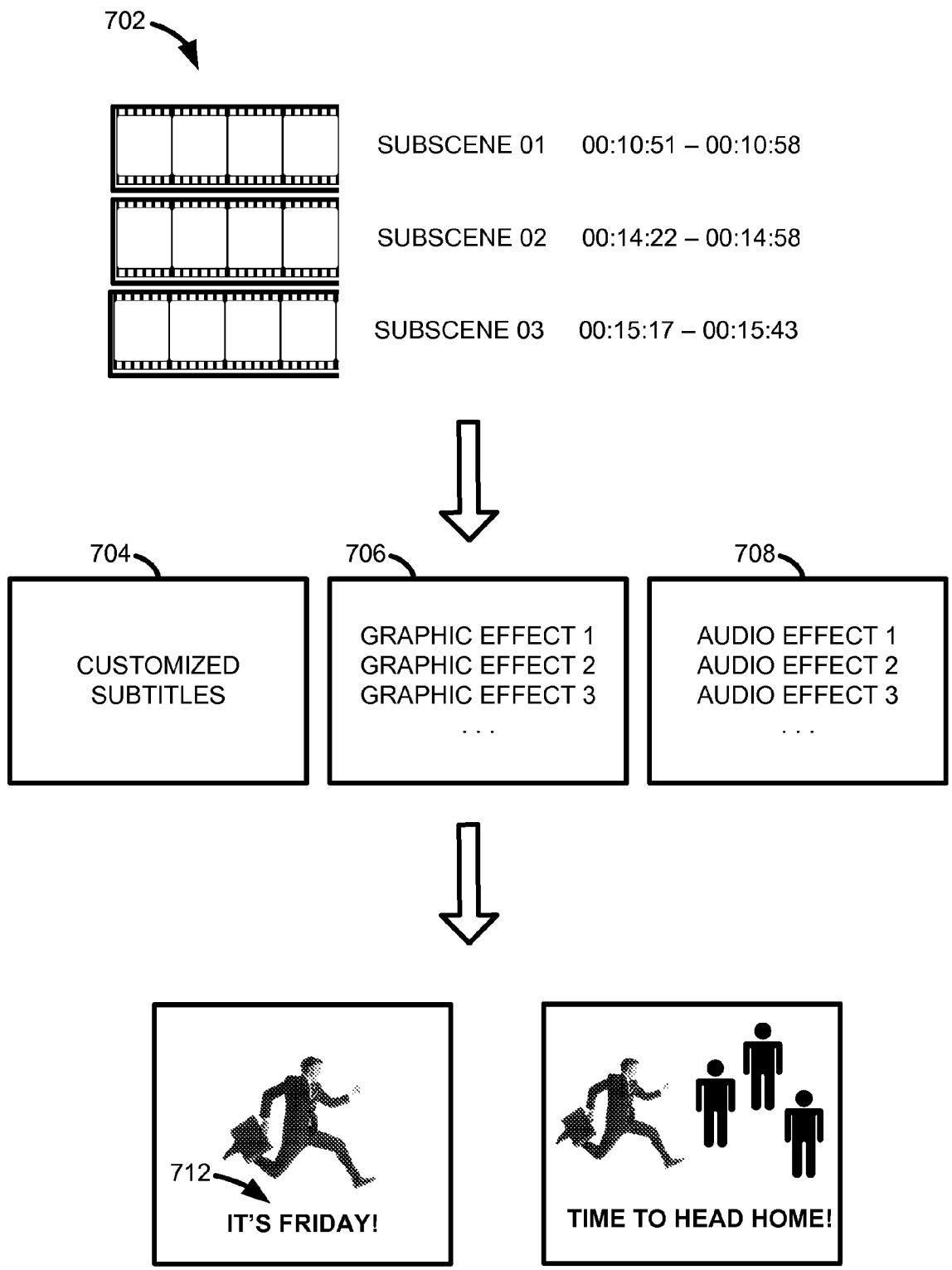
FIG. 7 illustrates the step shown in the exemplary method of FIGS. 4A-B for incorporating special effects during playback of the video title.

FIG. 7 illustrates the step shown in the exemplary method of FIGS. 4A-B for incorporating special effects during playback of the video title. The top of FIG. 7 shows a number of subscenes marked or identified by the subscene module from a particular scene specified by the user. It should be noted, however, that subscenes can also be marked from different scenes and are not limited to being marked from the same scene. Furthermore, the playback order of the subscenes may be re-arranged by the user and is not limited to the playback order associated with the original video title. In the non-limiting example shown, there are three subscenes of interest 702 presented to the user. The user may then modify the presentation of these subscenes of interest 702 by incorporating special effects. It should be emphasized that the user modifies the presentation of the video and not the video title itself. As such, the original video title is left unmodified. As described earlier, the special effects may be stored in a remix file. The remix file specifies the special effects to be incorporated upon playback of the original video title. As discussed earlier, subscenes of interest refer to subscenes or segments within a selected scene in which a subtitle is being displayed or in which audio content (e.g., dialog) is present. These subscenes of interest may later be edited by the user. (Alternatively, the user may elect to remove those subscenes that do not contain any subtitles or audio content.) The subscenes of interest are shown with corresponding begin and end times, which were automatically derived in accordance with the embodiments discussed above.

The user may specify any type of special effect. The special effects 704, 706, 708 shown in FIG. 7 are just a few non-limiting examples of how a user can modify the presentation of a set of video titles without modifying the original video content. The user may specify customized subtitles 704 to be displayed in place of original subtitles. A user may also elect to incorporate graphic effects 706. As an example, a user might insert an arrow within a subscene to emphasize a particular object. The user may also incorporate customized audio effects 708 into the video title. For example, the user can substitute the voices of certain actors within a subscene. Alternatively, the customized audio effects 708 can be mixed with the original audio in the video title. This might be useful, for example, if the user wants to incorporate personalized commentary during playback of the original video title. "Subscene 01" 702, for example, might correlate (with respect to timing and duration) with a line spoken by the main actor within the video title. The user can easier substitute another line without having to determine the exact location of the actor's line within the video title.

The bottom of FIG. 7 depicts playback of the original video title while incorporating special effects specified by the user. Referring back briefly to the example in FIG. 5, the individual 510 is shown running. The subtitle "I'm late for my meeting!" 512 is displayed while the individual 510 is running. In the subscene 520, the subtitle "Sorry. I'm in a rush." is displayed. Referring now to FIG. 7, the same video title is shown but with customized subtitles shown in place of the original subtitles. In the example shown, the subtitle "It's Friday!" is shown and corresponds with subscene 504 shown in FIG. 5. This is followed by the subtitle "Time to head home!" shown. The original voice of the individual may also be substituted.

In accordance with another embodiment, the subscene module described earlier may be configured to detect timing information relating to audio content. This information may comprise start and end times, for instance. In this regard, the subscenes automatically identified in accordance with the embodiments described herein may be identified in a variety of ways. This may include the use of time stamps and the use of frames to mark subscenes. Such timing information can then be utilized to precisely incorporate such special effects as customized lyrics, customized subtitles, and customized audio into the video. Such embodiments may be applied, for example, to music videos or KARAOKE titles for mixing purposes, whereby the customized special effects are played back with the original audio content of the video. In accordance with the embodiments described herein, it should also be emphasized that such customized video (e.g., music video, KARAOKE) may be produced from one particular video title or a combination of segments from multiple video titles.

It should be emphasized that the above-described embodiments are merely examples of possible implementations. Many variations and modifications may be made to the above-described embodiments without departing from the principles of the present disclosure. All such modifications and variations are intended to be included herein within the scope of this disclosure and protected by the following claims.

At least the following is claimed:

1. An apparatus for identifying scenes to be edited, comprising:
   a processor;
   a memory containing instructions stored therein which when executed causes the apparatus to perform the steps of:
   reading a video;
   receiving, by a scene selection module, a scene selection within the video, wherein the scene selection module is configured to receive a start time and an end time defining a scene;
   partitioning, by a subscene module, the selected scene into subscenes, configured to partition the selected scene into subscenes, wherein the subscene module is configured to analyze subtitles to determine subscenes of interest; and
   presenting, by an editing module, the subscenes of interest, wherein the editing module is further configured to receive editing commands for the subscenes of interest and to associate the editing commands with the subscenes of interest, to be incorporated during future playback of the video while the video is left unmodified, and wherein the playback module is further configured to incorporate the editing commands during playback of the video, wherein the editing commands are applied to the video during future playback of the video in order to display an edited version of the video, wherein the video is left unmodified.

2. The apparatus of claim 1, wherein the subscene module further comprises:
   a module for determining durations of subtitles displayed within the scene; and
   a module for analyzing audio content within the selected scene.

3. The apparatus of claim 1, wherein the editing module comprises:
   a module for receiving customized subtitles to be substituted in place of original subtitles within the video;
   a module for receiving customized audio content;
   a module for receiving one or more selections of subscenes to be removed based on whether the subscenes are subscenes of interest; and
   a module for receiving customized graphics.

4. The apparatus of claim 3, wherein the module for receiving customized subtitles is further configured to replace original subtitles with respect to content and with respect to duration during playback.

5. The apparatus of claim 4, wherein the module for receiving customized subtitles is further configured to incorporate audio matching the customized subtitles into the video during playback.

6. The apparatus of claim 3, wherein the module for receiving customized audio content is further configured to replace original audio content contained in the video during playback.

7. The apparatus of claim 3, wherein the module for receiving customized audio content is further configured to mix the customized audio content and original audio content contained in the video during playback.

8. The apparatus of claim 1, wherein the playback module is configured to read at least one of: a DVD, a High Definition DVD (HD-DVD), and a BLU-RAY Disc.

9. A method for identifying scenes to be edited, comprising:
   receiving a video with scenes to be edited;
   receiving a scene selection for editing, and receiving a start and an end time defining the scene;
   partitioning the selected scene into subscenes by analyzing subtitles;
   identifying subscenes of interest from among the subscenes based on the analyzed subtitles;
   receiving editing commands for the subscenes of interest; and
   associating the editing commands with the subscenes of interest, to be incorporated during future playback of the video, wherein the editing commands are applied to the video during playback of the video in order to display an edited version of the video, wherein the video is left unmodified.

10. The method of claim 9, wherein receiving a scene selection comprises:
    receiving a start time and end time with respect to the video; and
    defining a scene based on the start time and end time.

11. The method of claim 9, wherein receiving a scene selection comprises receiving a scene selection from one or more logical scenes within the video.

12. The method of claim 9, wherein partitioning the scene into subscenes based on the presence of subtitles comprises:
    determining durations of subtitles displayed within the scene; and
    partitioning the scene into subscenes based on the subtitle durations.

13. The method of claim 9, wherein partitioning the scene into subscenes based on audio analysis comprises:
    identifying distinct audio components occurring within the scene; and
    partitioning the scene into subscenes based on durations of the audio components.

14. The method of claim 9, wherein receiving editing commands for the subscenes of interest comprises at least one of:
    receiving customized subtitles to be substituted in place of original subtitles within the video;
    receiving one or more selections of subscenes to be removed based on whether the subscenes are subscenes of interest;
    receiving customized audio content; and
    receiving customized graphics.

15. The method of claim 14, wherein receiving customized audio content comprises replacing original audio content contained in the video during playback of the video while the video is left unmodified.

16. The method of claim 14, wherein receiving customized audio content further comprises mixing the customized audio content with original audio content contained in the video during playback of the video while the video is left unmodified.

17. The method of claim 9, further comprising incorporating the editing commands during playback of the video.

18. A method for editing video and performing playback of the video, comprising:
- receiving a scene selection for editing by receiving a start time and an end time with respect to the video;
- detecting timing information relating to audio content of the video, based on audio analysis;
- using time stamps and frames to mark subscenes based on the timing information of the analyzed audio;
- receiving editing commands for the subscenes;
- associating the editing commands with the video and generating a remix file to store the editing commands to be incorporated during future playback; and
- incorporating the editing commands from the remix file during playback of the video,
- wherein the editing commands are applied to the video during future playback of the video in order to display an edited version of the video wherein the video is left unmodified.

19. The method of claim 18, further comprising executing the editing commands from the remix file during playback of the video.

20. The method of claim 18, wherein receiving editing commands for the subscenes of interest comprises at least one of:
- receiving customized subtitles to be substituted in place of original subtitles within the video;
- receiving one or more selections of subscenes to be removed based on whether the subscenes are subscenes of interest;
- receiving customized audio; and
- receiving customized graphics.

21. The method of claim 20, wherein incorporating the editing commands from the remix file comprises replacing the original subtitles with the customized subtitles with respect to content and with respect to duration.

22. The method of claim 21, wherein incorporating the editing commands from the remix file further comprises incorporating audio matching the customized subtitles into the video.

23. The method of claim 20, wherein incorporating the editing commands from the remix file further comprises replacing original audio content with the customized audio content.

24. The method of claim 20, wherein incorporating the editing commands from the remix file further comprises mixing the customized audio content and original audio content contained in the video.

25. The method of claim 20, wherein incorporating the editing commands from the remix file further comprises superimposing the customized graphics on the video.

* * * * *